United States Patent [19]

Metzler et al.

[11] Patent Number: 5,156,218
[45] Date of Patent: Oct. 20, 1992

[54] LANDSCAPE EDGING ATTACHMENT

[76] Inventors: Dennis E. Metzler, 1394 N. Strickler Rd., Manheim, Pa. 17545; John W. Herr, 551 White Oak Rd., New Holland, Pa. 17557

[21] Appl. No.: 737,189

[22] Filed: Jul. 29, 1991

[51] Int. Cl.$^5$ .............................. A01B 45/00
[52] U.S. Cl. .............................. 172/15; 172/13; 172/120
[58] Field of Search ................ 172/13–18, 172/35, 118, 120, 123; 37/91, 92, 94; 56/256

[56] References Cited

U.S. PATENT DOCUMENTS

| | | | |
|---|---|---|---|
| 833,213 | 10/1906 | Howard | 172/120 |
| 1,106,541 | 8/1914 | Bruce | 172/120 |
| 2,464,695 | 3/1949 | Landrum | 172/15 |
| 2,555,441 | 6/1951 | Hackney | 172/15 |
| 2,664,507 | 1/1954 | Hedrick | 172/15 |
| 2,676,447 | 4/1954 | Asbury | 56/256 |
| 2,737,105 | 3/1956 | Wilson | 172/15 |
| 2,883,977 | 4/1959 | Smith | 172/120 |
| 2,942,360 | 6/1960 | Hawkins et al. | 37/91 |
| 2,969,601 | 1/1961 | McMaster | 37/91 |
| 3,057,411 | 10/1962 | Carlton | 172/120 |
| 3,537,244 | 11/1970 | Hicks | 172/15 |
| 3,711,158 | 1/1973 | Butler | 37/94 |
| 3,907,039 | 9/1975 | Remley et al. | 172/15 |
| 4,002,205 | 1/1977 | Falk | 172/123 |
| 4,046,200 | 9/1977 | Mullet et al. | 172/14 |
| 4,300,155 | 4/1980 | Mullet | 172/15 |
| 4,629,006 | 12/1986 | Mullet et al. | 172/15 |
| 4,691,784 | 9/1987 | Mullet et al. | 56/256 |
| 4,715,169 | 12/1977 | Ould | 56/256 |
| 4,930,580 | 6/1990 | Fuss et al. | 172/15 |
| 4,949,536 | 8/1990 | Neufeld | 56/256 |
| 4,979,573 | 12/1990 | Williamson | 172/15 |

FOREIGN PATENT DOCUMENTS

| | | | |
|---|---|---|---|
| 724416 | 11/1966 | Italy | 172/120 |
| 442839 | 1/1968 | Switzerland | 172/120 |

*Primary Examiner*—Randolph A. Reese
*Assistant Examiner*—Spencer Warrick

[57] ABSTRACT

A landscape edging machine detachably mounted to the frame of a commercial mower and connection to the power-takeoff shaft to provide rotational power through a drive mechanism to a rotatable cupped disc is disclosed wherein the edging machine is provided with a cupped disc having a serrated edge and being positionally angled with respect to the direction of travel of the machine to facilitate the digging of the soil out of a trench to form a line of demarcation between the grassed lawn area and the adjacent mulched plant bed. The rotatable disc is positioned proximate to the front wheels to permit the disc to easily track along with the mower around curved mulch bed lines. A gauge wheel forms a limit to the depth at which the disc will penetrate the ground. The attachment is pivotally moveable to an inoperative position above the ground.

18 Claims, 4 Drawing Sheets

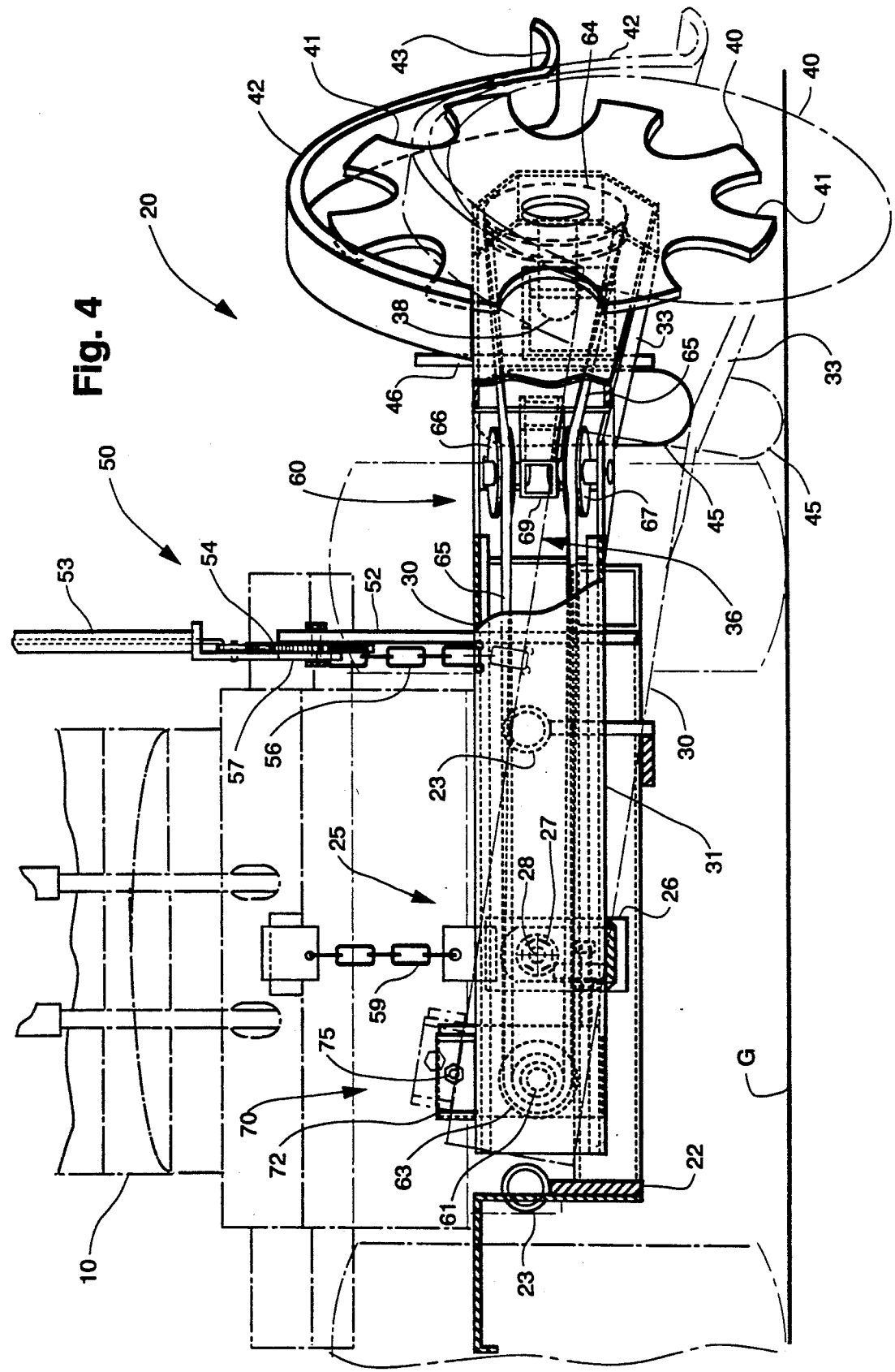

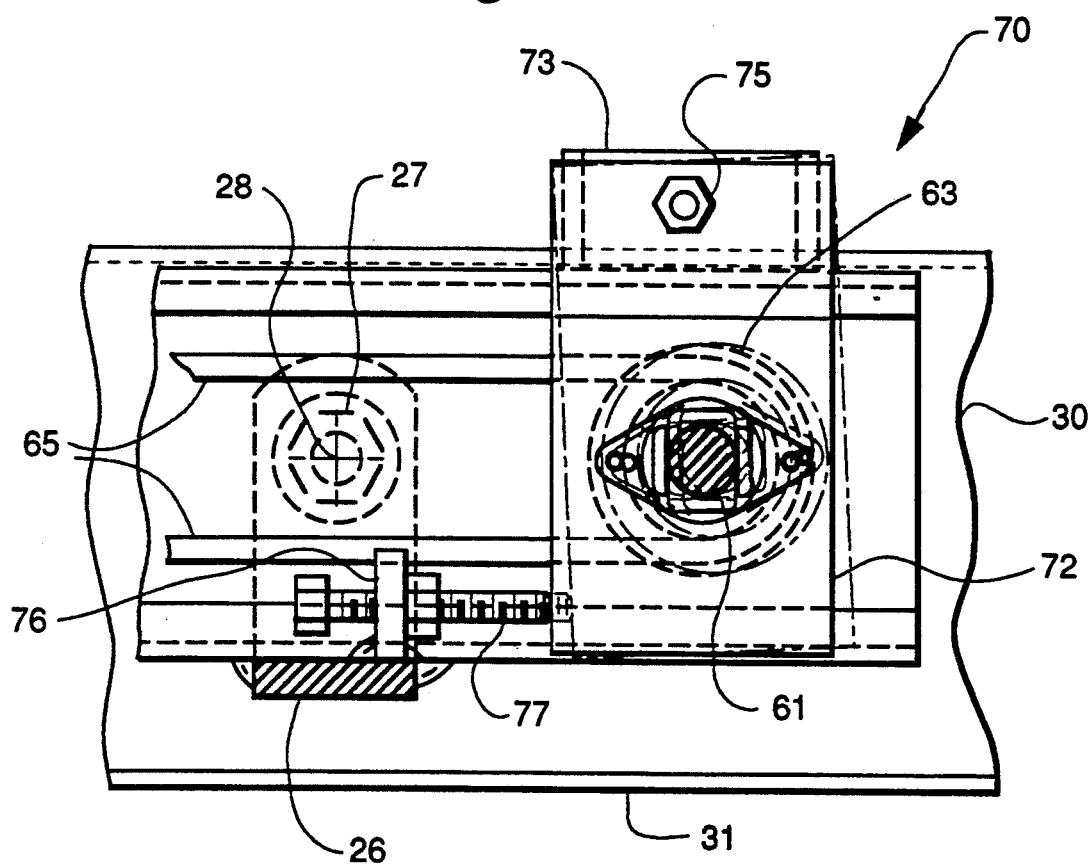

LANDSCAPE EDGING ATTACHMENT

BACKGROUND OF THE INVENTION

The present invention relates generally to machines for maintaining lawns and landscaped areas and, more particularly, to an attachment for a commercial mower for maintaining a line of demarcation between lawn areas and mulched beds.

Many landscaped areas include plant beds, usually having a mulch spread over the ground around the plants, adjacent to grassed lawn areas. It is preferable to maintain these mulched beds with a line of demarcation relative to the grassed area by forming a shallow trench therebetween. Commercially, this trench is usually formed by hand, removing the soil to a remote location. This hand process is very time consuming and, therefore, costly.

A number of powered lawn edging attachments are known in the prior art, such as shown, for example, in U.S. Pat. No. 3,537,244 issued to B. J. Hicks on Nov. 3, 1970; U.S. Pat. No. 4,002,205 issued to D. C. Falk on Jan. 11, 1977; and U.S. Pat. No. 4,200,155 issued to D. L. Mullet, et al on Apr. 29, 1980. These known powered lawn edging attachments cannot be operated to form the trenched demarcation line around intricate landscape lines in a rapid and cost effective manner, while discharging the soil therefrom into the mulched bed where it can be easily disposed of.

Commercial landscapers typically have lawn mowing machines utilizing a pair of driven wheels and at least one ground support wheel to support a frame over the surface of the ground to carry a mower deck for cutting the grassed areas. These commercial mowers are typically provided with a power-takeoff shaft which may be connected to various attachments that can be mounted to the mower frame. It would be desirable to provide an attachment that could be easily mounted to the frame of the commercial mower and connected to the power-takeoff shaft thereof to permit selective engagement with the ground to form a trenched line of demarcation between the landscaped lawn area and an adjacent mulched bed as the mower is driven on the grassed area next to the mulched bed.

SUMMARY OF THE INVENTION

It is an object of this invention to overcome the disadvantages of the prior art lawn edging machines by providing an attachment for commercial mowers that is operable to form a trenched line of demarcation between lawn areas and adjacent mulched beds.

It is an advantage of this invention that the trench forming attachment is detachably mountable to the frame of a commercial mower.

It is a feature of this invention that the trenched line of demarcation between the grassed lawn area and an adjacent mulched bed is formed by a powered rotating cupped disc engageable with the ground.

It is another advantage of this invention that the landscape edging attachment is operable to discharge soil from the formed trench onto the mulched bed to facilitate disposal thereof.

It is another object of this invention that the landscape edging attachment be operable to form a trenched line of demarcation along curved lines comprising the edge of mulched plant beds in landscaped areas.

It is still another feature of this invention that the cupped disc have a serrated circumferential edge to assist in the cutting of the soil and the objects therein.

It is yet another feature of this invention that the powered rotatable cupped disc, when mounted on the commercial mower frame, is located proximate to the front wheels of the mower to permit the landscape edging attachment to closely follow the shortest turning radius of the mower.

It is yet another feature of this invention that the landscape edging attachment can be carried by the commercial mower in an inoperative position while the mower is being driven from one location to another.

It is a further feature of this invention that the cupped disc is positioned angularly with respect to the direction of travel to form a trenched line of demarcation and effect a discharge outwardly away from the mower and operator.

It is yet another advantage of this invention that the depth of the trench being formed by the landscape edging machine can be controlled by a adjustable gage wheel.

It is still another object of this invention to provide a landscape edging attachment for a commercial mower which is durable in construction, inexpensive of manufacture, carefree of maintenance, facile in assemblage, and simple and effective in use.

These and other objects, features and advantages are accomplished according to the instant invention by providing a landscape edging machine detachably mounted to the frame of a commercial mower and connectable to the power-takeoff shaft to provide rotational power through a drive mechanism to a rotatable cupped disc. The cupped disc has a serrated edge and is positionally angled with respect to the direction of travel of the machine to facilitate the digging of the soil out of a trench to form a line of demarcation between the grassed lawn area and the adjacent mulched plant bed. The rotatable disc is positioned proximate to the front wheels to permit the disc to easily track along with the mower around curved mulch bed lines. A gage wheel forms a limit to the depth at which the disc will penetrate the ground. The attachment is pivotally moveable to an inoperative position above the ground.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a cross-sectional view of the edging attachment taken along lines 4—4 of FIG. 3 to depict an elevational view of the edging attachment, a portion of the shielding being broken away to better show a part of the drive mechanism for rotatably powering the ground engaging disc, the pivotal movement of the edging attachment into the ground engaging position being shown in phantom; and FIG. 5 is a cross-sectional detail view of the drive adjustment mechanism incorporated into the edging attachment as seen taken along lines 5—5 of FIG. 3, the pivotal movement of the adjustment block being shown in phantom.

DETAILED DESCRIPTION OF THE PREFERRED EMBODIMENT

Figure 1:
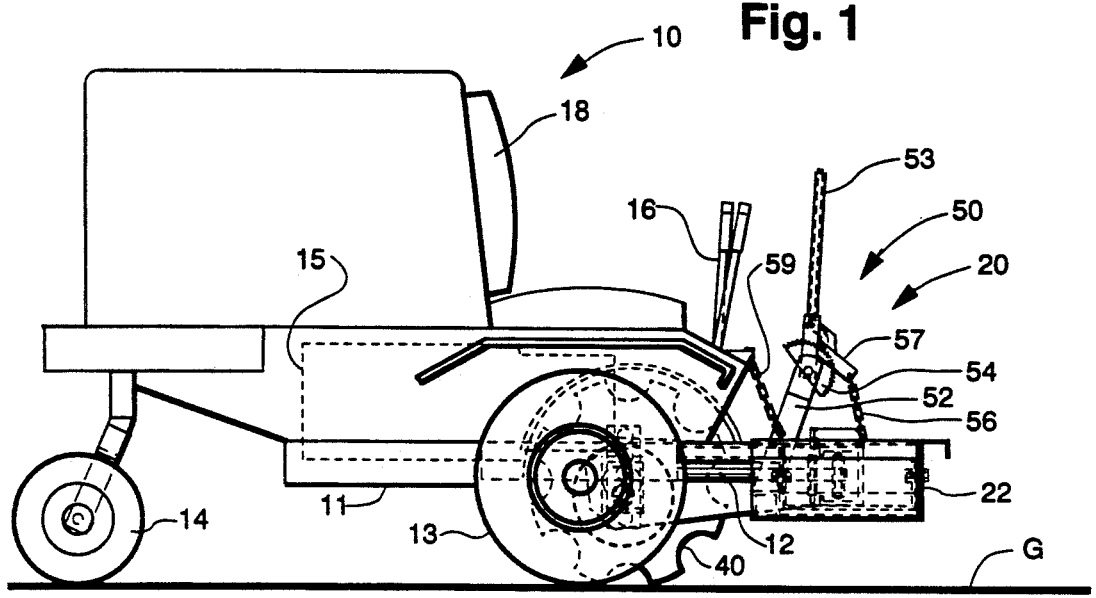
FIG. 1 is a right side elevational view of a commercial mower incorporating the principles of the instant invention, the edging attachment being mounted to the frame of the mower for engagement with the ground to the left side thereof.

Referring now to the drawings and, particularly, to FIG. 1, the commercial mower having mounted thereon an edging attachment incorporating the principles of the instant invention can best be seen. Any left and right references are made as a matter of convenience and are determined by standing at the rear of the commercial mower, facing the forward direction and the edging attachment mounted on the forward end thereof.

The commercial mower 10 is a conventional wheeled vehicle on which is typically mounted a mowing deck (not shown) for mowing vegetation, such as grasses, growing on the surface of the ground G. The mower 10 includes a frame 11 supported above the ground G by a pair of driven ground wheels 13 and at least one ground support wheel 14. The frame 11 of the mower 10 carries a source of propulsion and rotational power, such as a conventional gasoline engine schematically indicated by the dotted line 15. Mowers 10 of the type depicted in FIG. 1 typically utilize a hydraulic system operably driven by the engine 15 to effect rotation of the driven wheels 13. Directional control of such mowers 10 is accomplished through manipulation of control sticks 16 in a normal manner. Operative power for the mower deck (not shown) or any other attachment carried by the frame 11 of the mower 10 is provided through a convention power-takeoff shaft 19 operably driven by the engine 15. The operator is seated on the operator's seat 18 in full view of the ground over which operation of the mower 10 will be accomplished.

Figure 2:
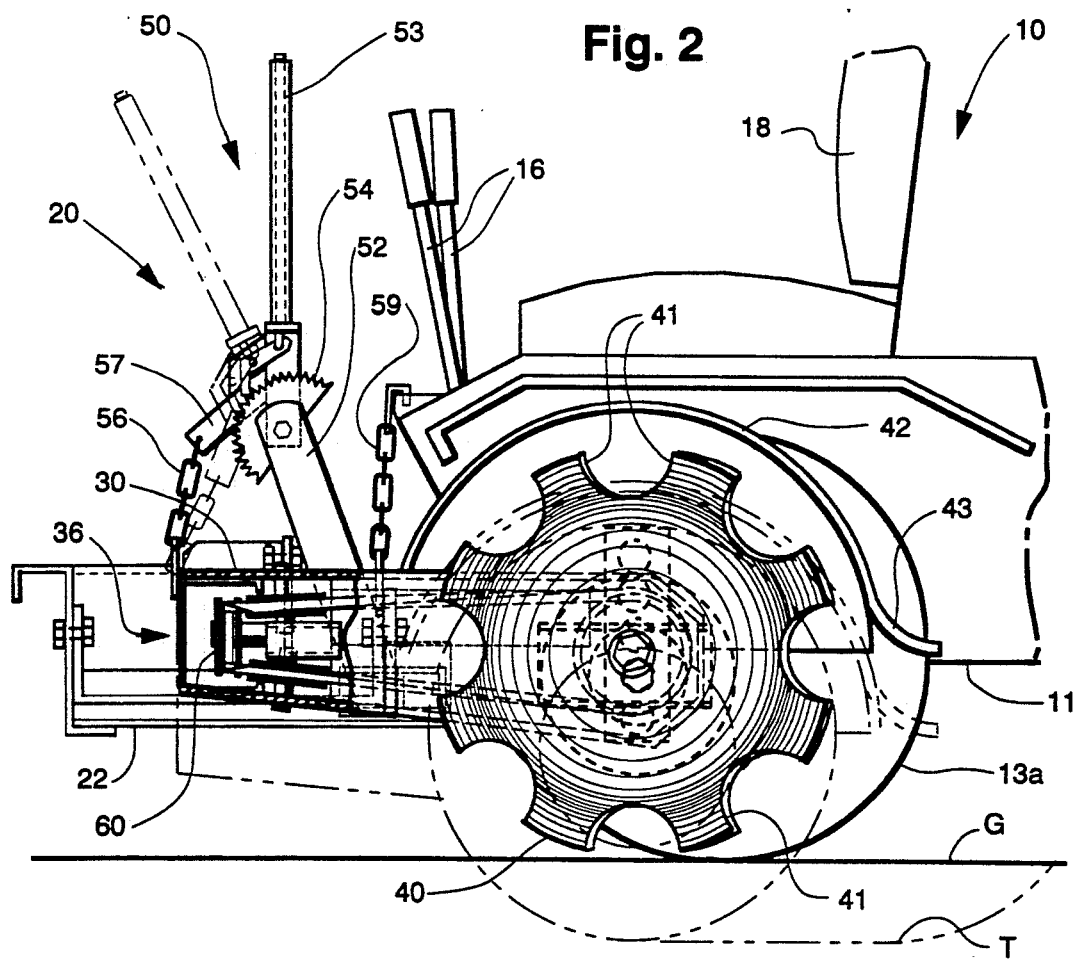
FIG. 2 is an enlarged left side elevational view of the edging attachment mounted on the mower seen in FIG. 1, the ground engaging position of the edging attachment being shown in phantom.
Figure 3:
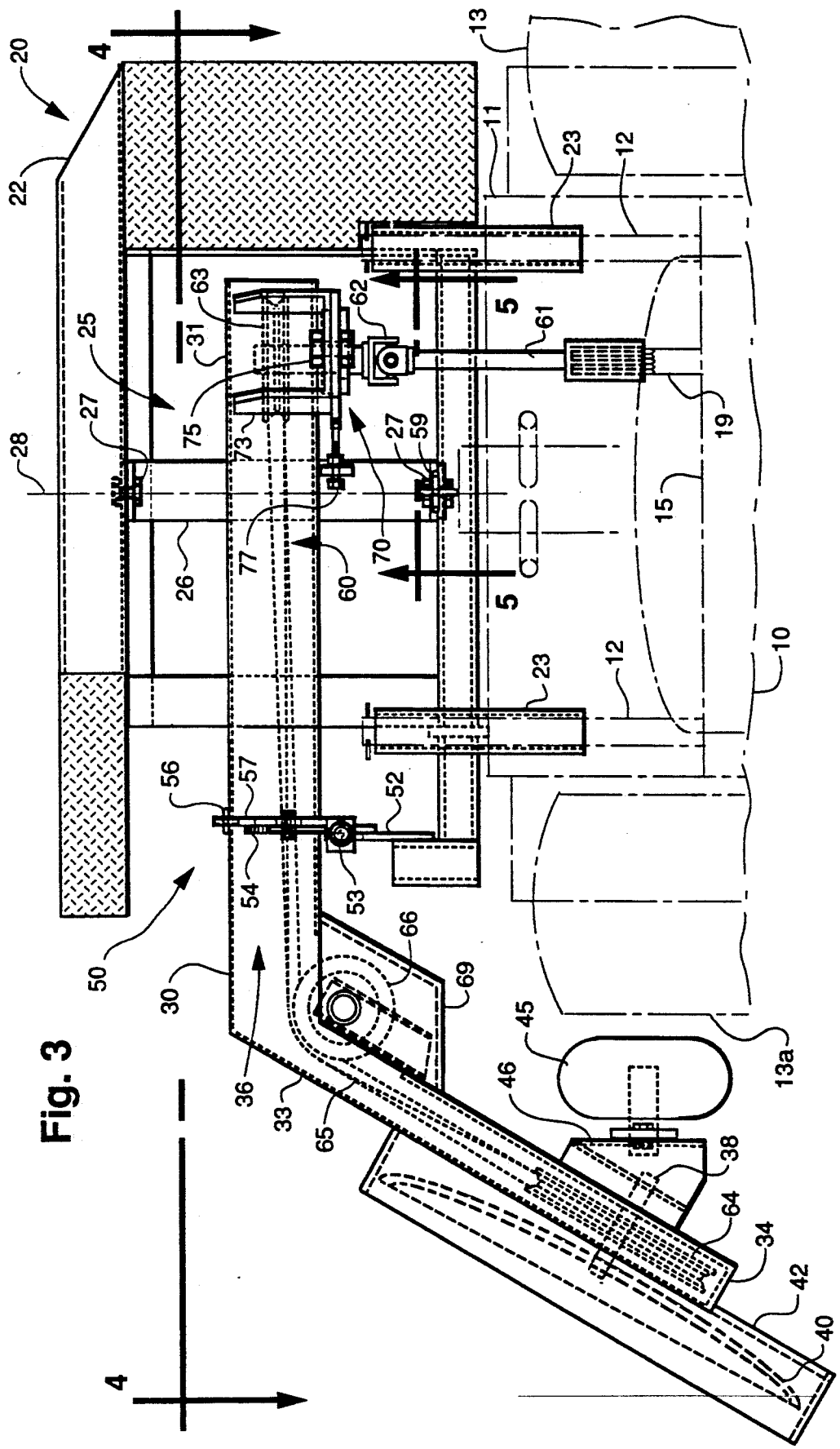
FIG. 3 is a top plan view of the edging attachment with the enclosed drive mechanism being depicted in dotted lines and the commercial mower to which the edging attachment is mounted being partially shown in phantom.

Referring now to FIGS. 2-4, the structural details of the edging attachment 20 can best be seen. The edger 20 includes a subframe 22 carrying transversely spaced sleeves 23 adapted for receipt therein of a corresponding pair of forwardly protruding mounting rods 12 affixed to the mower frame 11 to carry standard attachments, such as the mower deck (not shown). The subframe 22 also carries a pivot mechanism 25, including a pivotable support member 26 connected to the subframe 22 by fasteners 27 defining a longitudinally extending pivot axis 28 for purposes described in greater detail below.

The edger 20 further includes an angled support beam 30 having a transverse leg 31 connected to the pivoted support member 26 for pivotal movement of the support beam 30 about the longitudinally extending horizontal pivot axis 28. The support beam 30 also has a rearwardly extending support leg 33 integrally formed with the transverse leg 31 to establish a hollow cavity 36 within the support beam 30 to house the drive mechanism 60 as described in greater detail below. The support leg 33 extends rearwardly from the transverse leg 31 to form an obtuse angle when viewed from above as seen in FIG. 3, preferably in the range of about 120 degrees to orient the rotatable disc 40 with the plane thereof oriented at an acute angle of approximately 30 degrees to the direction of travel, as is also described in greater detail below.

As best seen in FIG. 3, the support leg 33 terminates in a rearward end 34 located outboard of and to the immediate left of the left drive wheel 13a. The support leg 33 carries a rotatable spindle 38 near the rearward end 34 to which is fastened a cupped disc 40 for rotation therewith. The support leg 33 also has mounted thereto a semi-circular guard 42 extending around the circumferential periphery of the disc 40 and shielding the operator from the rotatable disc 40. The guard 42 is provided with a discharge tail 43 that directs soil and other debris discharged from the disc 40 toward the ground G. The support leg 33 may also have mounted thereto an optional gauge wheel 45 rotatably supported by a mounting bracket 46 affixed to the support leg 33 opposite the rotatable disc 40 to position the gauge wheel 45 adjacent the left drive wheel 13a of the mower 10.

The cupped rotatable disc 40, as best seen in FIGS. 2 and 4, includes a serrated circumferential periphery forming radially extending teeth 41 which are capable of cutting into the surface of the ground G and through normal organic matter, such as vegetation and small tree roots, and even small stones which may be dug out of the ground by the rotating disc 40. The disc 40 is rotated by the drive mechanism 60 counter-clockwise when viewed from the left side of the mower 10, as depicted in FIG. 2, to discharge soil and other matter rearwardly from the disc 40. The angular orientation of the disc 40 relative to the direction of travel of the mower 10, due to the parallel support thereof from the support leg 33, causes the rotating disc 40, when engaged into the ground G, to form a trench T into the surface of the ground G as the mower 10 and attached edger 20 are moved forwardly along the direction of travel. The discharge of soil and other matter from the rotating disc 40, because of the angular orientation of the disc 40 relative to the direction of travel, will be directed outwardly from the mower 10.

As best seen in FIGS. 1 through 4, the edger 20 is provided with a position adjustment mechanism 50. A post 52 is affixed to the subframe 22 and has mounted thereto a pivoted handle 53 and a conventional ratchet mechanism 54 cooperable therewith to fix the pivoted position of the handle 53 in a selected orientation. A flexible link 56 extends from a tab 57, connected to the pivoted handle 53 and movable therewith, to the support beam 30 to limit pivotal movement of the support beam 30 about the pivot axis 28, which because of the greater amount of structure of the support beam 30 being positioned to the left of the pivot axis 28 is caused by gravity to lower the disc 40 toward the ground. Accordingly, the pivoted position of the support beam 30 relative to the subframe 22 and the mower 10 can be controlled through manipulation of the position adjustment mechanism 50. A second flexible link 59 interconnects the frame 11 of the mower 10 and the subframe 22 of the edger 20 to help stabilize the edger 20 relative to the mower 10.

The pivotal movement of the support beam 30 about the pivot axis 28 vertically moves the rotatable disc 40 between a raised inoperative position above the ground G, as depicted in solid lines in FIG. 2, and an operative position in which the disc 40 is engaged with the ground G to form a trench T therein upon operative rotation of the disc 40. The depth to which the disc 40 is insertable into the ground G is controlled in part by manipulation of the position adjustment mechanism 50, although the maximum depth to which the disc 40 can penetrate the ground G can be controlled by the gauge wheel 45, which acts as a limit to the pivotal movement of the support beam 30 when resting against the ground G. To selectively vary the depth to which the disc 40 can penetrate the ground G, the gauge wheel 45 can be positionally adjustable relative to the mounting bracket 46 in a conventional manner.

A drive mechanism 60 is housed within the hollow cavity 36 of the support beam 30 and includes an input shaft 61 operably connected to the power-takeoff shaft 19 of the mower 10 to rotatably drive a first drive sheave 63. A second driven sheave 64 is affixed to the spindle 38 to be rotatable therewith and with the rotatable disc 40. A flexible belt 65 is entrained around both the drive sheave 63 and the driven sheave 64 to transfer rotational power received by the drive sheave 63 from the input shaft 61 to the driven sheave 64 to power the rotation of the disc 40. A suitably positioned pair of idler sheaves 66, 67, rotatably supported by a mounting assembly 69 affixed to the support beam 30 at the intersection of the transverse leg 31 and the support leg 33, permit the flexible belt 65 to make the transition between the transverse leg 31 and the support leg 33 and remain within the cavity 36. One skilled in the art will readily realize that: alternative drive mechanisms could also be provided to transfer rotational power from the mower power-takeoff shaft 19 to the rotatable disc 40, such as, for example, a chain drive mechanism, a gear drive mechanism, possibly incorporating a gear box, or other equivalent conventional drive mechanisms.

It will be noted by one skilled in the art that the pivotal movement of the support beam 30 about the pivot axis 28 results in a limited amount of vertical movement of the drive sheave 63 which is accommodated by a universal joint 62 within the input shaft 61. Wear and/or stretching of the flexible belt 65 is accommodated by a drive adjustment mechanism 70 best seen in FIG. 5. The input shaft 61 and the drive sheave 63 are rotatably supported by a pivoted plate 72. A bracket 73 is attached to the support beam 30 so as to be movable therewith. The bracket 73 carries a pivot bolt 75 pivotally supporting the plate 72. A stop bolt 77 is threadably received by a tab 76 affixed to the support beam and extends therefrom to engage the pivoted plate 72 and control the pivotal movement thereof about the pivot bolt 75. Manipulation of the stop bolt 77 relative to the tab 76 will effect a generally horizontal movement of the drive sheave 63 away from the idler sheaves 66, 67 and the driven sheave 64 to take-up any slack in the flexible belt 65.

In operation, the edger 20 can be easily mounted on the mower 10 by sliding the edger 20 toward the mower 10 so that the mounting rods 12 insert into the sleeves 23 on the edger subframe 22. Clipping the stabilizer link 59 to the frame 11 of the mower 10 and connecting the input shaft 61 to the mower power-takeoff shaft 19 places the edger 20 into an operative condition. Once the mower 10 is maneuvered into position adjacent a mulch bed (not shown), the position adjustment mechanism 50 can be manipulated to effect a pivoting of the support beam 30 about the pivot axis 28 and lower the rotatable disc 40 toward the ground G. The depth to which the disc 40 is permitted to penetrate the ground G can be preselected by an appropriate positioning of the gauge wheel 45 relative to its mounting bracket 46 and by the amount of movement of the pivoted handle 53 relative to the rachet mechanism 54.

Once the mower power-takeoff shaft 19 is energized to deliver rotational power from the mower engine 15 to the edger drive mechanism 60, the rotatable disc 40 will dig into the surface of the ground G to form a trench T as the mower 10 is moved over the surface of the ground G adjacent the mulch bed. Steering of the mower 10 in a conventional manner, such as by causing a differential speed of rotation of the drive wheels 13, will permit the disc 40 to closely follow the edge of the mulch bed, as the disc 40 is positioned adjacent the left drive wheel 13a. Since the disc 40 is rotated at an axis extending at an in the range of approximately 150 degrees to the direction of travel of the mower 10 and mounted edger 20, the cupped disc 40 forms a trench T below the surface of the ground G as the mower 10 moves forwardly. The soil and/or other debris encountered by the rotating disc 40 is discharged outwardly away from the trench T. The guard 42 and discharge tail 43 control the trajectory of the discharged soil from the disc 40 and generally keep the soil and debris close to the formed trench T for disposal from the mulch bed.

Since the rotation of the disc 40 is actively powered and since the circumferential periphery of the disc 40 is serrated, the disc 40 is operable to cut through vegetation, packed soil, tree roots, etc. to the depth permitted by the gauge wheel 45 and to discharge this material away from the trench T formed thereby. The resulting trench T forms a line of demarcation between the grassed lawn areas and the adjacent mulch bed, which is desired in such landscaped areas. Since the formation of the trench T is mechanized, considerable cost savings is gained over the hand formation of the trench T.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An edging apparatus for creating a line of demarcation between grassed areas and non-grassed areas in landscaped grounds, comprising:

a frame mountable on a prime mover having ground wheels supporting said prime mover for movement over the ground along a direction of travel;

a support member movably supported from said frame, said support member including a transversely extending support beam having a hollow transverse leg pivotally mounted to said frame and a hollow support leg connected to said transverse leg to extend rearwardly therefrom;

a disc rotatably mounted to said support leg to be movable therewith relative to said frame, said disc being positioned adjacent one of said ground wheels of said prime mover; and a drive mechanism supported within said supporting leg and said transverse leg and operably interconnecting said disc and said prime mover to provide a source of rotational power for rotation of said disc.

2. The edging apparatus of claim 1 wherein said support member is pivotally mounted to said frame to permit generally vertical movement of said disc relative to said frame.

3. The edging apparatus of claim 2 wherein said support leg is oriented at an obtuse angle with respect to the direction of travel of said prime mover, said disc being rotated about an axis of rotation extending at an obtuse angle to said direction of travel.

4. The edging apparatus of claim 3 wherein said disc is cupped and has a serrated circumferential periphery.

5. The edging apparatus of claim 4 wherein the pivotal movement of said support beam relative to said frame is controlled by a position adjustment mechanism interconnecting said frame and said support beam.

6. The edging apparatus of claim 5 wherein said support leg has mounted thereto a depth limiting device operable to limit the depth of penetration of said disc into the ground.

7. The edging apparatus of claim 6 wherein said depth limiting device comprises a gauge wheel adjustably mounted on a mounting bracket affixed to said support leg such that the relative position between said gauge wheel and said support leg can be selectively varied.

8. The edging apparatus of claim 1 wherein said drive mechanism includes an input shaft detachably connectable to a power-takeoff shaft on said prime mover to provide a source of rotational power, said drive mechanism also including a drive sheave connected to said input shaft for rotation therewith, a remote driven sheave coupled to said disc for rotation therewith, and an endless flexible member entrained around said drive sheave and said driven sheave to transfer rotational power therebetween and driving the rotation of said disc.

9. The edging apparatus of claim 8 wherein said drive mechanism further has a drive adjustment apparatus including a plate pivotally mounted on said support beam and a stop bolt threadably supported on said support beam for engagement with said plate to control the pivotal movement thereof, said drive sheave being rotatably supported by said plate and pivotable therewith to vary the distance between said drive sheave and said driven sheave and accommodate any variations in the length of said flexible member.

10. An edging apparatus detachably mountable on a mower for selectively creating a trench between grassed areas and nongrassed areas in landscaped grounds, comprising:

a frame mountable on said mower having ground wheels supporting said prime mover for movement over the ground along a direction of travel, said frame including mounting means engageable with corresponding mounts on said mower to permit said frame to be detachably supported on said mower;

a support beam pivotally attached to said frame to be movable relative thereto about a generally horizontally extending pivot axis, said support beam including a transverse leg and a support leg integrally joined to said transverse leg and forming an obtuse angle relative thereto, said support leg terminating at a remote end adjacent one of said ground wheels of said mower, said support beam forming a hollow cavity extending contiguously through both said transverse leg and said support leg;

a disc rotatably mounted to said support leg at said remote end thereof and projecting below said support leg to be engageable with and to penetrate into the ground outboard of said one ground wheel, said disc being vertically movable with said remote end about said pivot axis;

a position adjustment mechanism interconnecting said support beam and said frame to control the pivotal movement of said support beam about said pivot axis which, in turn, controls the depth of penetration of said disc into the ground; and a drive mechanism operably interconnecting said disc and said mower to provide a source of rotational power for driving the rotation of said disc, said drive mechanism being housed within said hollow cavity, said driven disc being operable to form a trench in the ground upon forward movement of said mower.

11. The edging apparatus of claim 10 wherein said disc is cupped and is mounted for rotation about a rotational axis extending at an obtuse angle relative to the direction of travel of said mower such that said cupped disc engages the ground in an orientation angled relative to said direction of travel, the soil from the trench formed by said cupped disc being discharged from said cupped disc outwardly from said trench upon rotation of said cupped disc.

12. The edging apparatus of claim 11 wherein said cupped disc is operatively associated with a guard affixed to said support leg to control the discharge of soil and debris from said cupped disc.

13. The edging apparatus of claim 12 wherein said guard includes a discharge tail operable to direct discharged soil and debris to the ground adjacent said formed trench.

14. The edging apparatus of claim 11 wherein said support leg has a mounting bracket affixed thereto for adjustably mounting a gauge wheel such that the relative position between said gauge wheel and said support leg can be selectively varied, said gauge wheel being operable to limit the depth of penetration of said cupped disc into the ground, said gauge wheel and said cupped disc being mounted on opposing sides of said support leg outboard of said one ground wheel.

15. In an edging apparatus for forming a line of demarcation between grassed areas and non-grassed areas in landscaped grounds, said edging apparatus being cooperatively associated with a power means to provide a source of operative power therefor, said edging apparatus being mobilely supported over the ground by ground wheels permitting movement thereof along a direction of travel, the improvement comprising:

a pivotally movable hollow support beam including a pivoted transverse leg and a generally longitudinally extending support leg connected to said transverse leg and passing proximate to one of said ground wheels, said transverse leg being pivotable about a generally horizontally extending pivot axis; and a disc having a serrated circumferential periphery and being rotatably mounted on said support leg to locate said disc adjacent one of said ground wheels associated with the movement of said edging apparatus over the ground, said disc being rotatable within a plane oriented at an acute angle to the direction of travel, said disc being drivingly connected to said power means by a drive means housed within said support beam for operatively powering the rotation of said disc, said disc being generally vertically movable into and out of engagement with the ground for selectively forming a trench ending below the surface of the ground to form said line of demarcation upon rotation of said disc while moving along said direction of travel.

16. The edging apparatus of claim 15 wherein said disc is cupped and is operatively associated with a depth control mechanism to limit the depth of penetration of said cupped disc into the ground for the formation of said trench, said cupped disc having a guard operatively associated therewith to control and to direct the discharge of soil and debris from said cupped disc during the formation of said trench.

17. The edging apparatus of claim 15 wherein said one ground wheel is rotatably mounted to a prime mover supporting said edging apparatus over the ground, said one ground wheel being rotatable in a fixed, non-steering orientation relative to said prime mover.

18. The edging apparatus of claim 17 wherein said support leg extends rearwardly from said transverse leg and positions said disc to be generally vertically movable about said pivot axis.

* * * * *